(12) United States Patent
Takeguchi (10) Patent No.: US 7,274,561 B2
(45) Date of Patent: Sep. 25, 2007

(54) ELECTRONIC DEVICE

(75) Inventor: Koichiro Takeguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/521,769

(22) Filed: Sep. 15, 2006

(65) Prior Publication Data

US 2007/0081304 A1 Apr. 12, 2007

(30) Foreign Application Priority Data

Oct. 7, 2005 (JP) ............................ P2005-294779

(51) Int. Cl.
*H05K 5/00* (2006.01)
(52) U.S. Cl. ...................... 361/681; 345/169; 455/557; 312/200
(58) Field of Classification Search ................ 345/161, 345/169; 455/575.1, 557; 381/306, 333; 312/200; 361/679–687, 724–727
See application file for complete search history.

(56) References Cited

U.S. PATENT DOCUMENTS 5,724,704 A * 3/1998 Seo .............................. 16/254

| | | | |
|---|---|---|---|
| 6,496,369 B2 * | 12/2002 | Nakamura | 361/697 |
| 6,785,128 B1 * | 8/2004 | Yun | 361/683 |
| 6,850,407 B2 | 2/2005 | Tanimoto et al. | |

FOREIGN PATENT DOCUMENTS

JP 2004-053927 2/2004

* cited by examiner

*Primary Examiner*—Hung Van Duong
(74) *Attorney, Agent, or Firm*—Blakely Sokoloff Taylor & Zafman, LLP (57) ABSTRACT

According to one embodiment, an electronic device includes: a main body; a display device including an inputting unit; a hinge mechanism that joints the main body and the display device; and a projection portion projecting from the main body. The hinge mechanism includes a turning axis that allows the display device to turn on a turning axial line arranged along one side of the display device, and a swinging axis that allows the display device to swing together with the turning axis on an axial line arranged in a direction that intersects with the turning axis. The projection portion interferes with the display device when the display device is swung on the swinging axis in the state that the display device is overlaid on the main body.

5 Claims, 8 Drawing Sheets

ELECTRONIC DEVICE

CROSS-REFERENCE TO RELATED APPLICATIONS

This application is based upon and claims the benefit of priority from Japanese Patent Application No. 2005-294779, filed Oct. 7, 2005, the entire contents of which are incorporated herein by reference.

BACKGROUND

1. Field

One embodiment of the invention relates to an electronic device capable of turning a display device over on a main body.

2. Description of the Related Art

In the electronic device represented by the notebook portable computer, the cellular phone, or the like, the main body and the display device are hinged together. A hinge provided to the electronic device set forth in Japanese Patent Application Publication (KOKAI) No. 2004-53927 has the turning axis and the swinging axis, which intersect with each other. The turning axis supports the display device to turn between a closed state, in which a display face of the display device is overlaid with face down on the main body, and an open state, in which the display face is set up from the main body. The swinging axis is arranged in the direction that intersects with the turning axis, and the display device together with the turning axis is swung on the swinging axis with respect to the main body. Also, when the display device is moved around the turning axis and the swinging axis, such display device is brought into a reversed state, in which the display face is turned upside down on the main body. The display device of this electronic device has a touch panel that the user can touch directly even in the reversed state to input.

In particular, the interlocking mechanism is provided to the display device. This interlocking mechanism prevents an inadvertent rotation of the display device around the swinging axis with respect to the main body when the display device is moved between the open state and the closed state and between the reversed state and the open state respectively. Also, this interlocking mechanism is provided in such a manner that, when the display panel is positioned on the turning axis at some angle to the main body, a rotational resistance on the swinging axis is reduced. Also, a latch mechanism is provided to prevent a movement of the display device around the turning axis in the closed state or the reversed state.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an electronic device including: a main body including an upper surface on which a keyboard is provided; a display device including an inputting unit that allows a user to input operations on a display face of the display device; a hinge mechanism that joints the main body and the display device, the hinge mechanism including, a turning axis that allows the display device to turn on a turning axial line arranged along one side of the display device, from a state that the display device is overlaid on the main body to a state that the display device is set up from the main body, and a swinging axis that allows the display device to swing together with the turning axis on an axial line arranged in a direction that intersects with the turning axis; and a projection portion formed to project from the main body, the projection portion being interfering with the display device when the display device is swung on the swinging axis in the state that the display device is overlaid on the main body.

Figure 1:
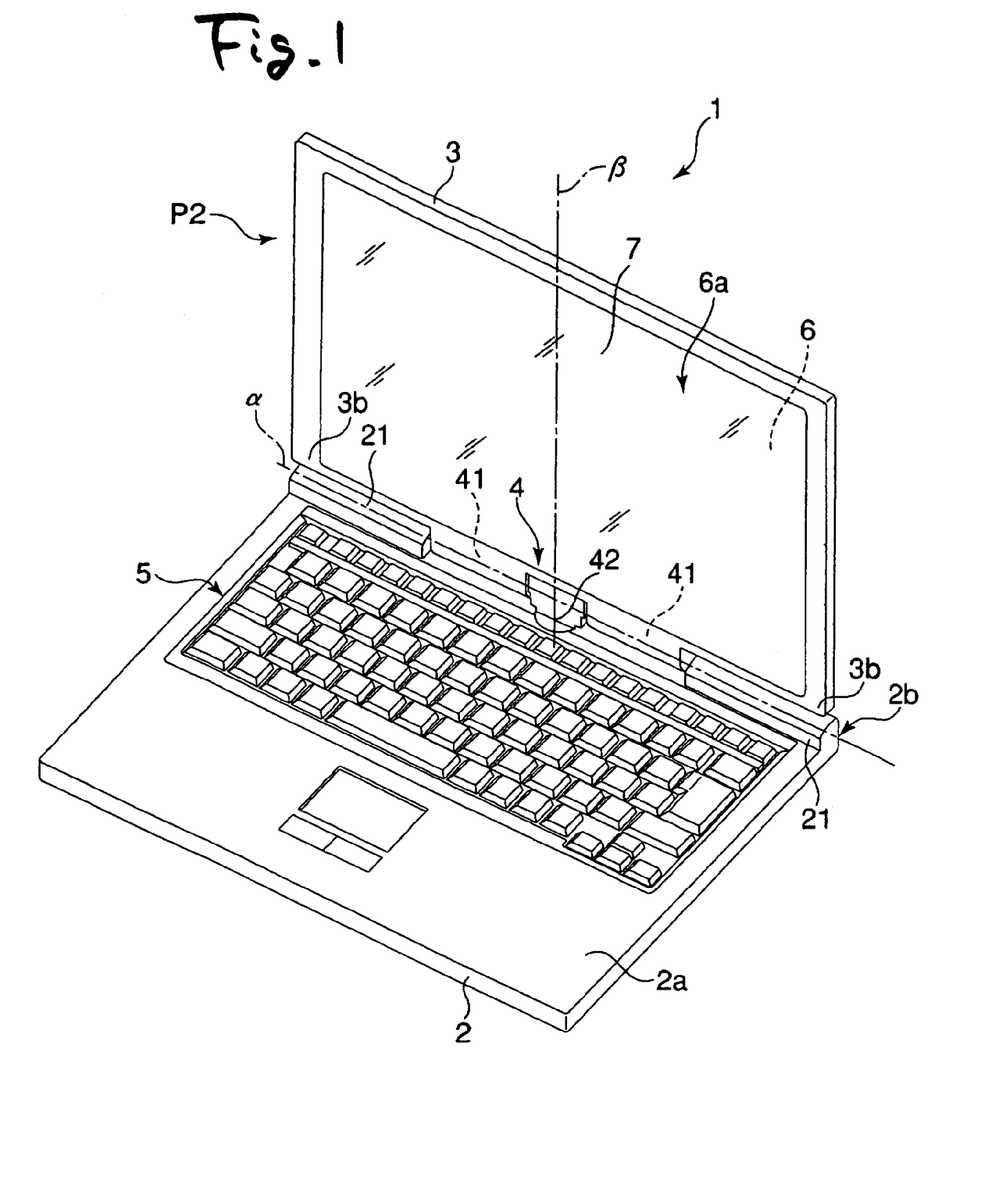
FIG. 1 is an exemplary perspective view showing an electronic device according to an embodiment of the present invention.

The electronic device 1 shown in FIG. 1 has a main body 2, a display device 3, a hinge mechanism 4, and projection portions 21. The main body 2 has a circuit board on which CPU, and the like are mounted, a memory medium, and the like therein, and has a keyboard 5 on an upper surface 2a. The display device 3 has a liquid crystal display 6 and a touch panel 7.

The liquid crystal display 6 is an example of the display portion that is connected to the circuit board built in the main body 2 to display information. Similarly, a plasma display, an organic electroluminescence, a surface-conduction electron-emitter display, or the like may be employed. The touch panel 7 is an inputting unit used to execute an inputting operation from a display face 6a. This touch panel 7 is laminated on the display face 6a of the liquid crystal display 6, and used to execute the inputting operations that are related with information displayed on the liquid crystal display 6.

Figure 2:
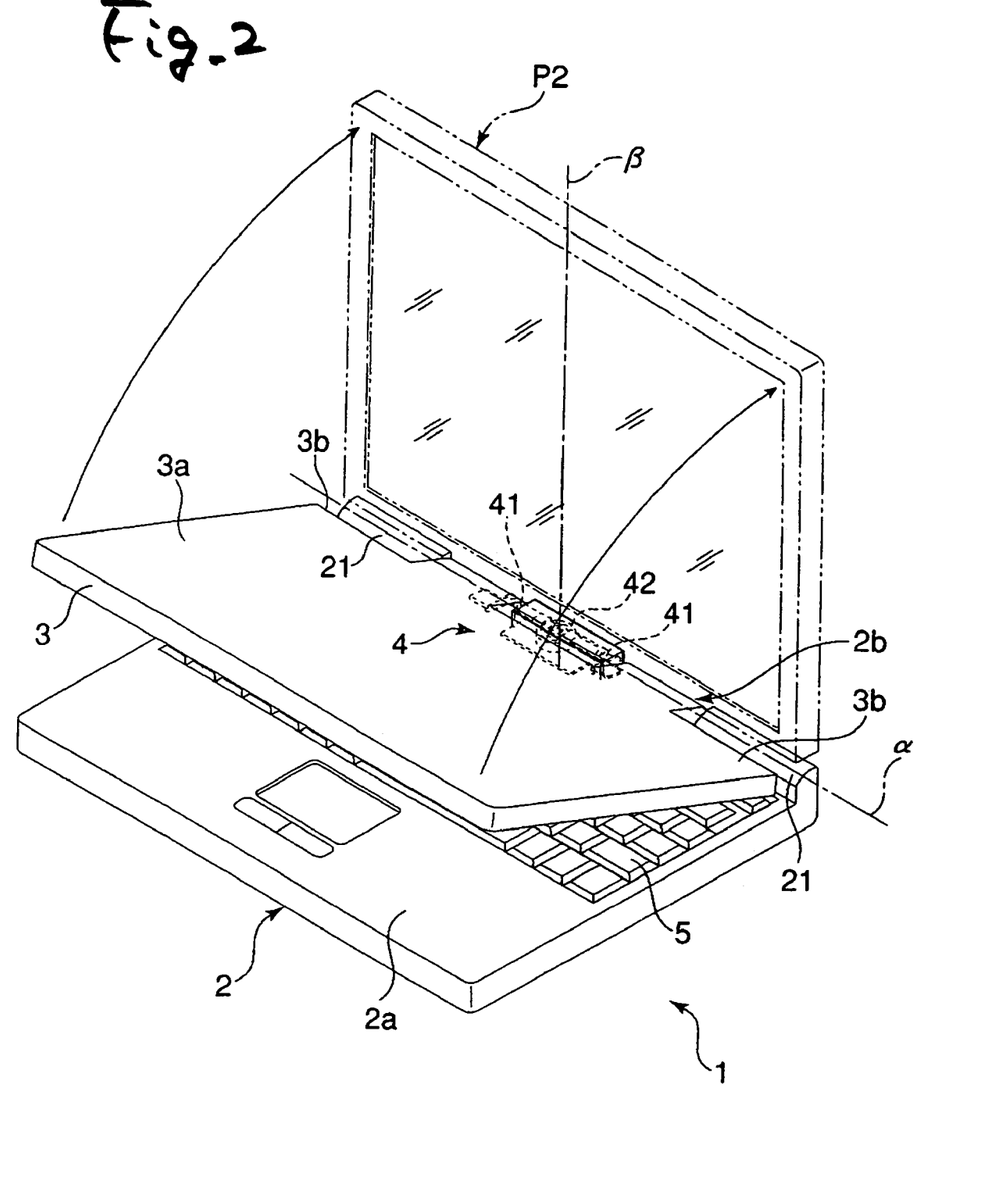
FIG. 2 is an exemplary perspective view showing such a situation that the display device as shown in FIG. 1 is turned on a turning axis of the electronic device.
Figure 3:
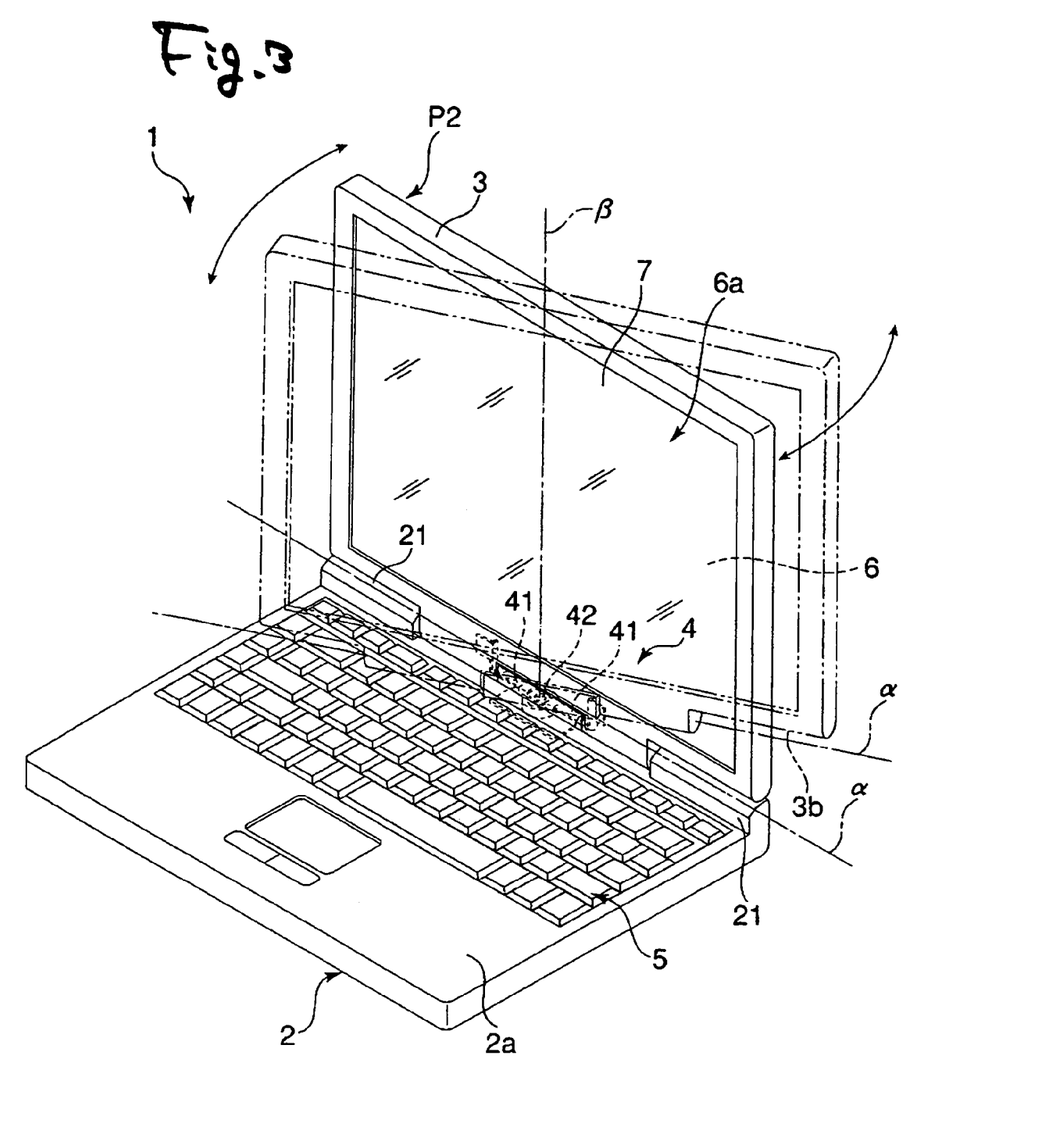
FIG. 3 is an exemplary perspective view showing such a situation that the display device as shown in FIG. 1 is swung on a swinging axis of the electronic device.
Figure 5:
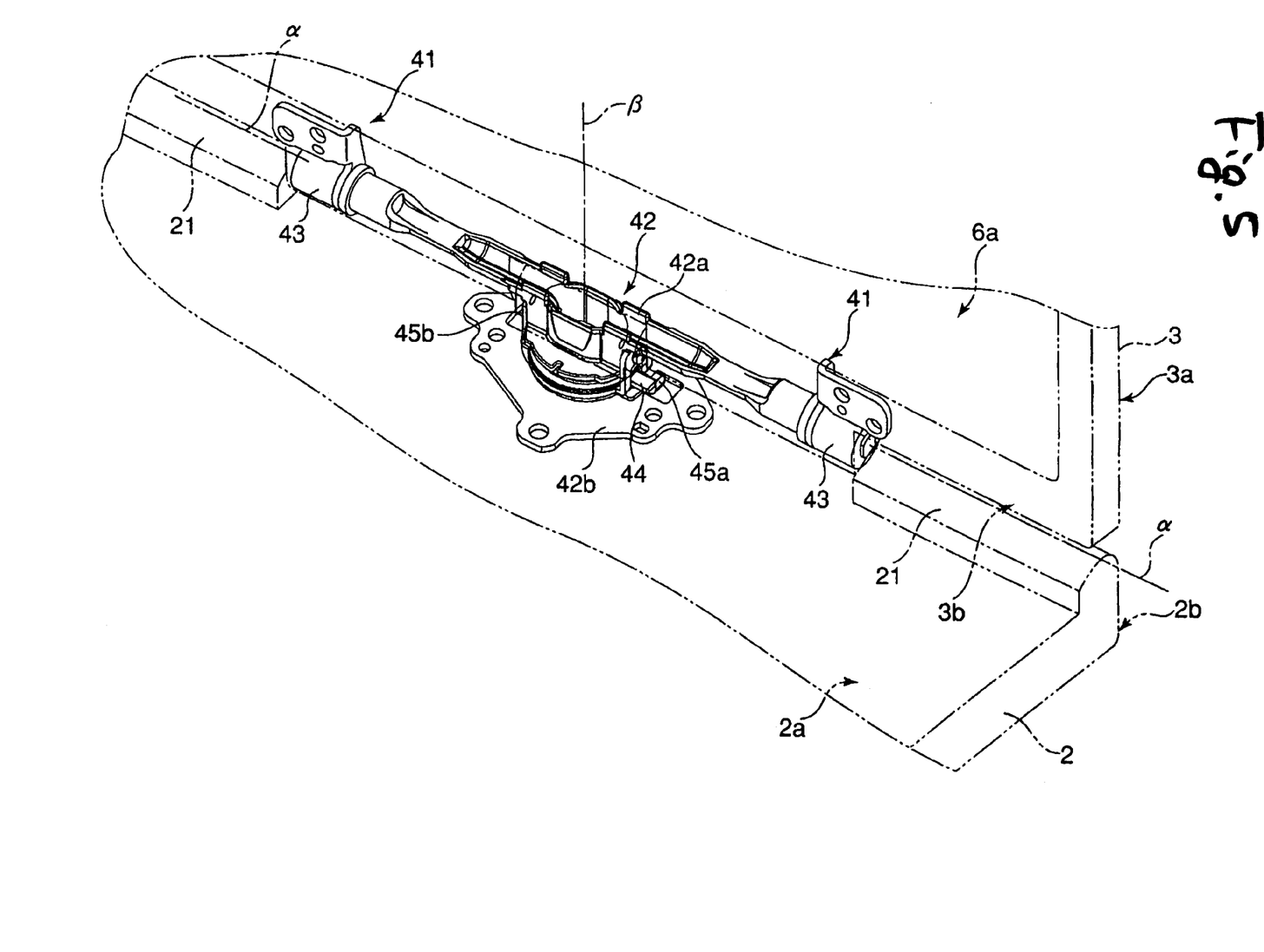
FIG. 5 is an exemplary perspective view showing a hinge mechanism of the electronic device as shown in FIG. 1.

As shown in FIG. 5, the hinge mechanism 4 has a turning axis 41 and a swinging axis 42, and joints the main body 2 and the display device 3. As shown in FIG. 2, the turning axis 41 is provided to turn the display device 3 on an axial line α from a state that the display device 3 is overlaid on the main body 2 to a state that the display device 3 is set up from the main body 2. This axial line α is arranged along one side of the display device 3 that is close to the rear side of the main body 2. As shown in FIG. 3, the swinging axis 42 is provided to swing the display device 3 on an axial line β together with turning axis 41. This axial line β is arranged in the direction that intersects orthogonally with the turning axis 41 of the display device 3.

Figure 4:
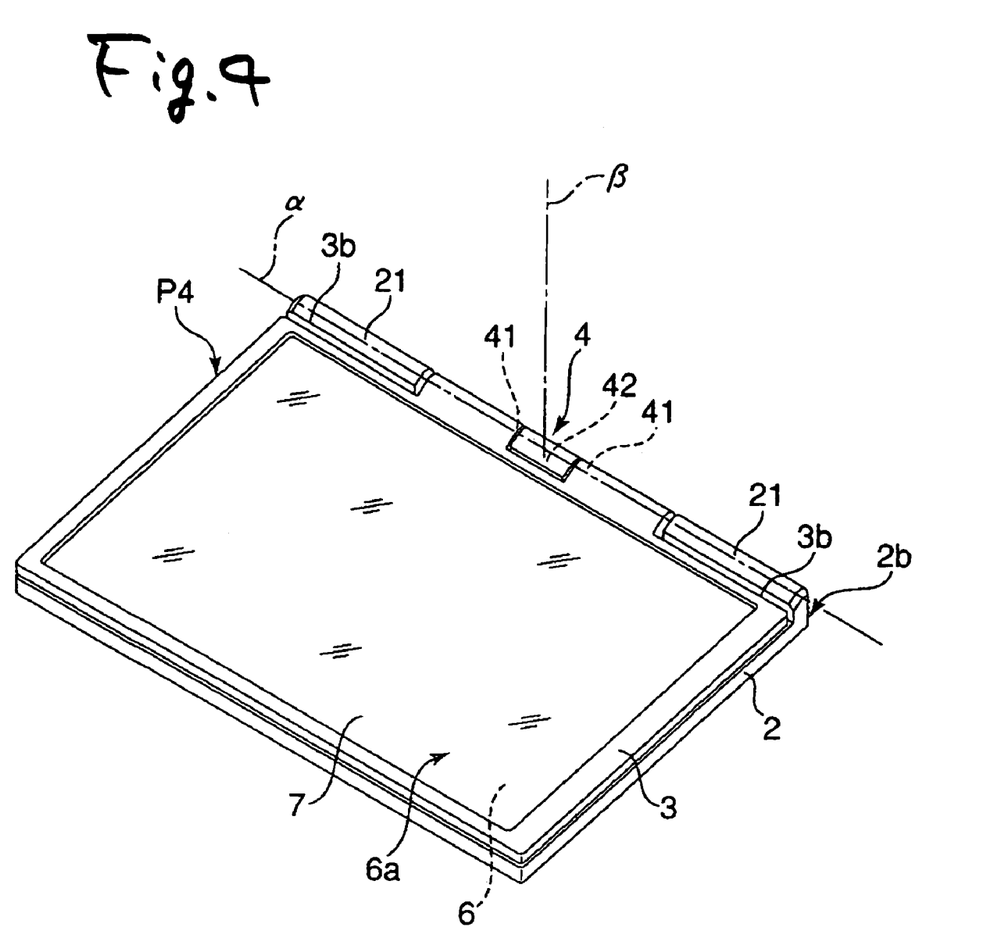
FIG. 4 is an exemplary perspective view showing such a situation that the display device as shown in FIG. 1 is turned over.

As the state that the display device 3 is overlaid on the main body 2, there are a closed state (first state) P1 and a reversed state (fourth state) P4 shown in FIG. 4. In this closed state P1, the display face 6a on which the touch panel 7 is fitted is overlaid on the main body 2 toward the keyboard 5. In this reversed state P4, a back surface 3a of the display device 3 is overlaid on the main body 2 toward the keyboard 5 in a situation that the display face 6a is turned upside down toward the outside. As the state that the display device 3 is set up from the main body 2, there are an open state (second state) P2 and a swung state (third state) P3. In this open state P2, the display face 6a is opposed to the keyboard side. In this swung state P3, the back surface 3a of the display device 3 is directed to the keyboard 5.

Therefore, the hinge mechanism 4 turns the display device 3 on the turning axis 41 from the closed state P1 to the open state P2 and from the swung state P3 to the reversed state P4. In other words, the display device 3 is turned substantially over 180° on the turning axis 41 from a position where the display face 6a is overlaid with face down on the main body 2 to a position where the display face 6a is turned upside down. Also, the hinge mechanism 4 turns the display device 3 over 180° on the swinging axis 42 from the open state P2 to the swung state P3.

Also, the hinge mechanism 4 has a torque mechanism 43 on both ends of the turning axis 41. This torque mechanism 43 has a torque that urges the display device 3 toward the main body 2 in a position where the display device 3 is overlaid on the main body 2. That is, the hinge mechanism 41 is the so-called retractable hinge. This torque mechanism 43 acts in either of the closed state P1 and the reversed state P4 of the display device 3, but does not act in the open state P2 and the swung state P3. The swinging axis 42 is a hollow axis through which signal cables of the liquid crystal display 6 and the touch panel 7 are passed.

An arm 44 extended from the axial line β in the radial direction is provided to a swing portion 42a of the swinging axis 42. Stoppers 45a, 45b that contact the arm 44 are provided to a base portion 42b of the swinging axis 42. The arm 44 comes into contact with the stopper 45a in the closed state P1 and the open state P2, and comes into contact with the stopper 45b in the swung state P3 and the reversed state P4.

Figure 9:
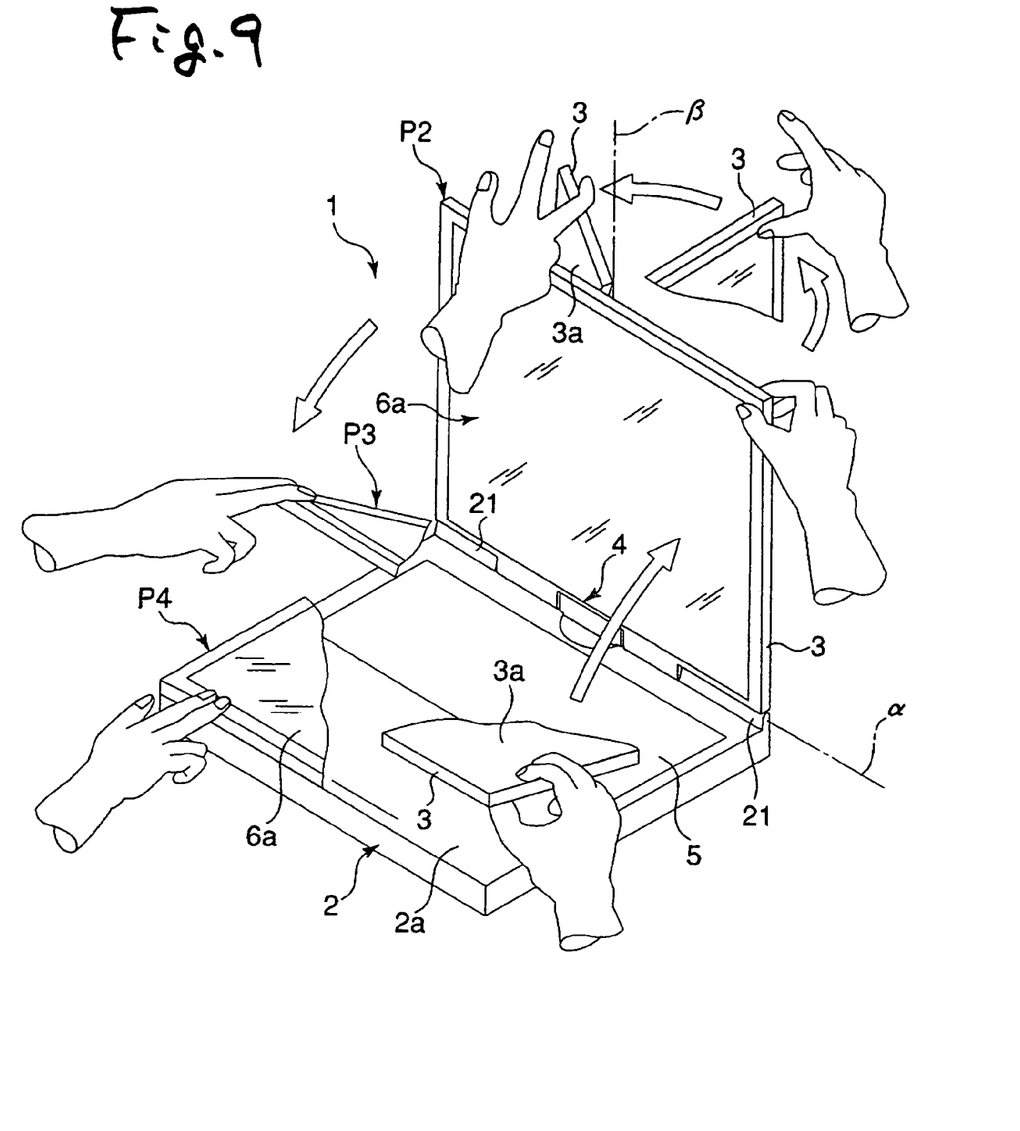
FIG. 9 is an exemplary perspective view showing schematically a series of operations required to shift the display device of the electronic device as shown in FIG. 1 from the closed state to the reversed state.

An operation of reversing the display device 3 of the electronic device 1 equipped with the hinge mechanism 4 constructed as above will be explained with reference to FIG. 9 hereunder. As shown in FIG. 9, the display device 3 is set up on the turning axis against the urging force of the torque mechanism 43 from the closed state P1 to the open state P2. Then, the display device 3 is brought into the swung state P3 when the arm 44 is swung on the swinging axis 42 until the arm 44 comes into contact with the stopper 45b. Since the display device 3 is not further turned from the swung state P3 because of the stopper 45b, such display device 3 is overlaid on the main body 2 in the reversed state P4 to turn the display face 6a upside down on the turning axis 41 when the display device 3 is pulled down further toward this side. Since the display device 3 is pushed toward the main body side by the torque mechanism 43, the display device 3 is never rickety in the reversed state P4.

Figure 6:
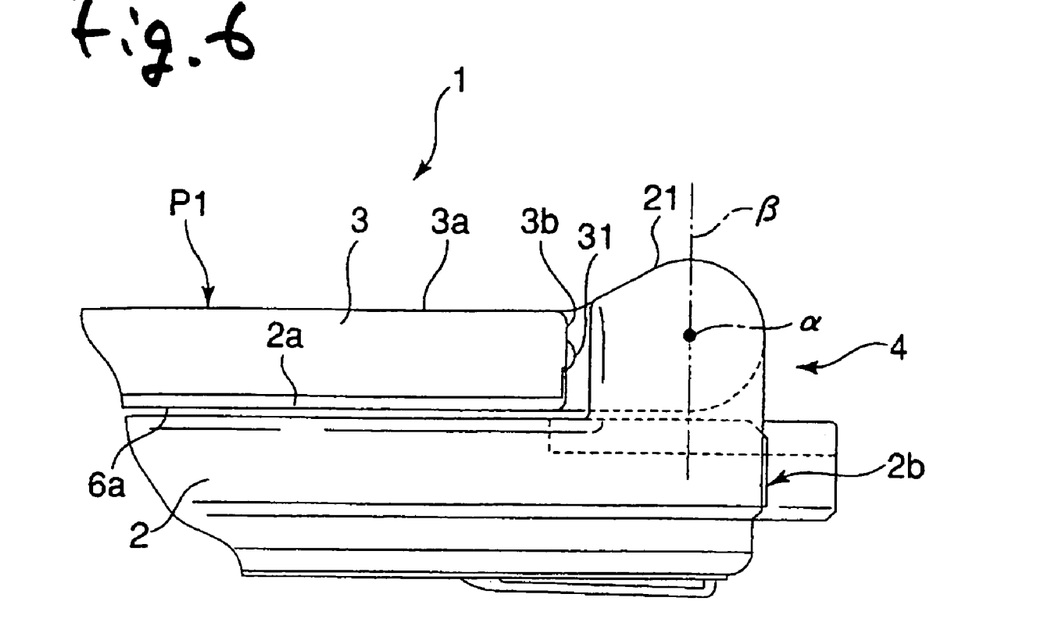
FIG. 6 is an exemplary side view showing a rear portion of the electronic device as shown in FIG. 1 in a closed state.
Figure 7:
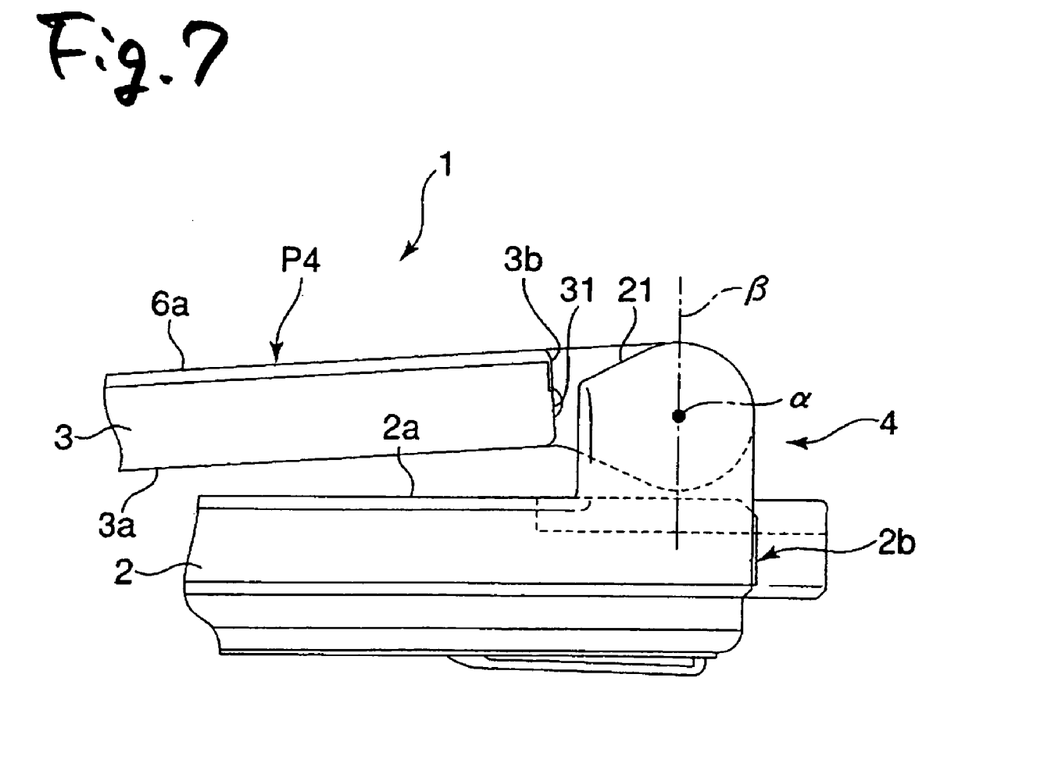
FIG. 7 is an exemplary side view showing the rear portion of the electronic device as shown in FIG. 1 in a reversed state.

As shown in FIG. 6 and FIG. 7, the display device 3 is fitted to deviate from a center of the turning axis 41. The display face 6a of the display device 3 becomes parallel with the upper face 2a of the main body 2 in the closed state P1 shown in FIG. 1. Then, the display device 3 is slightly inclined in the reversed state P4 shown in FIG.7 such that the display face 6a is away from the upper face 2a of the main body 2 as a position of the display face 6a comes closer to the hinge mechanism 4. Therefore, when the electronic device 1 is put on the desk and used in the reversed state P4, an operability of the touch panel 7 can be improved because the display face 6a is inclined toward the user side.

As shown in respective Figures, the projection portions 21 are projected from the main body 2 to the upper face side on which the display device 3 is overlaid on the main body 2 and provided along a rear portion 2b of the main body 2. The projection portions 21 are positioned on a prolonged line of the turning axis 41 in the closed state P1 and the reversed state P4. That is, the projection portions 21 interfere with the display device 3 along the rotation direction of the swinging axis 42 in the closed state P1 shown in FIG. 1 or the reversed state P4 shown in FIG. 7, by a bottom portion of the display device 3 abutting against the projection portion 21.

A rubber pad 31 acting as the impact absorbing material is fitted to an edge 3b of the display device 3, which faces to the projection portion 21. The pad 31 is separated from the projection portion 21 in FIG. 6 and FIG. 7, nevertheless the pad 31 is provided in such a way that the pad 31 comes into touch with the projection portion 21 in the closed state P1 and the reversed state P4. As a result, the display device 3 is held stably on the main body 2.

Figure 8:
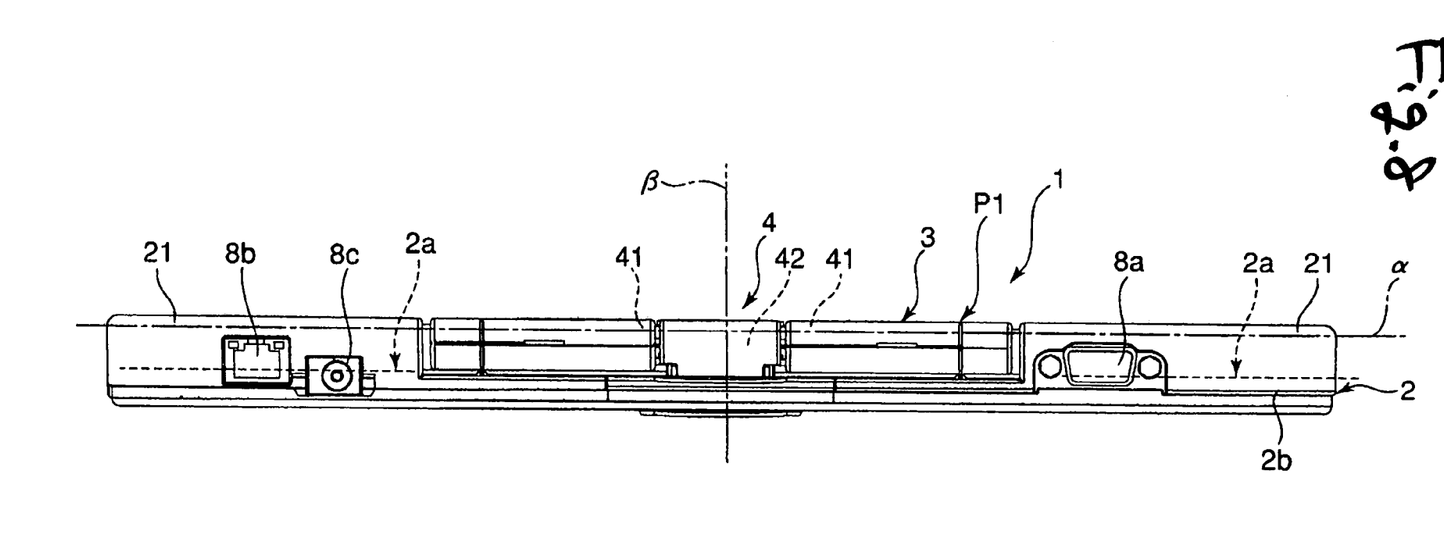
FIG. 8 is an exemplary side view showing the closed state of the electronic device as shown in FIG. 1 when viewed from the back side.

As shown in FIG.8, the rear portion 2b and the projection portions 21 of the main body 2 are provided continuously, and an RGB connector 8a, a LAN connector 8b, and a head phone connection terminal 8c are arranged across from the main body 2 to the projection portions 21. The RGB connector 8a, the LAN connector 8b, and the head phone connection terminal 8c are an example of the external connection terminals respectively. In addition, the external connection terminals such as an antenna input terminal, a video terminal, a digital video terminal, an audio terminal, a modem connector, and the like, of which connection external dimensions are larger than a thickness of the main body 2, may be provided.

Here, the connection external dimension signifies an external dimension of an area that is needed to provide the external connection terminals, and contains the external dimensions of the jack and the plug that are inserted into the external connection terminal. Since the external connection terminal with the small connection external dimension can be provided not across from the main body 2 to the projection portions 21, such external connection terminal may be provided any place of the outer periphery of the main body 2. Also, in the case of the electronic device 1 in the present embodiment, the main body 2 and the projection portions 21 are provided to the side portion to constitute the same flat surface. Therefore, the external connection terminal with the larger connection external dimension than a thickness of the main body 2 can be provided to this area.

In the electronic device 1 constructed as above, the external connection terminals are arranged on the rear portion 2b of the main body 2 across from the main body 2 to the projection portions 21. Therefore, a thickness of the main body 2 can be thinned irrespective of a size of the external connection terminal. Also, because the projection portions 21 are provided to the electronic device 1, a rotational movement of the display device 3 on the swinging axis 42 is inhibited in the closed state P1 or the reversed state P4. Also, the torque mechanism 43 is provided to the turning axis 41. As a result, in the electronic device 1, the display device 3 can be held firmly on the main body 2 without the latch mechanism not to become unstable in the closed state P1 or the reversed state P4.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. An electronic device comprising:
    a main body including an upper surface on which a keyboard is provided;
    a display device including an inputting unit that allows a user to input operations on a display face of the display device;
    a hinge mechanism that joints the main body and the display device, the hinge mechanism including,
        a turning axis that allows the display device to turn on a turning axial line arranged along one side of the display device, from a state that the display device is overlaid on the main body to a state that the display device is set up from the main body, and
        a swinging axis that allows the display device to swing together with the turning axis on an axial line arranged in a direction that intersects with the turning axis; and
    a projection portion formed to project from the main body, the projection portion being interfering with the display device when the display device is swung on the swinging axis in the state that the display device is overlaid on the main body.

2. The electronic device according to claim 1, further comprising an external connection terminal that is provided across from the main body to the projection portion.

3. The electronic device according to claim 1, wherein the display device includes a pad that faces to an edge of the projection portion in the state that the display device is overlaid on the main body, and that acts as an impact absorbing material.

4. The electronic device according to claim 1, wherein the turning axis includes a torque mechanism that urges the display device toward the main body in a position where the display device is overlaid over the main body.

5. The electronic device according to claim 1, wherein the projection portion interferes with the display device by a bottom portion of the display device abutting against the projection portion.

* * * * *